US006906165B2

(12) United States Patent
Di Silvestro et al.

(10) Patent No.: US 6,906,165 B2
(45) Date of Patent: *Jun. 14, 2005

(54) COPOLYAMIDES AND COMPOSITIONS BASED ON SAME

(75) Inventors: Giuseppe Di Silvestro, Lentate sul Seveso (IT); Franco Speroni, Ceriano Laghetto (IT); Cuiming Yuan, Milan (IT); Haichun Zhang, Saronno (IT)

(73) Assignee: Rhodia Engineering Palstics S.R.L., Ceriano Leghetto (IT)

(*) Notice: Subject to any disclaimer, the term of this patent is extended or adjusted under 35 U.S.C. 154(b) by 0 days.

This patent is subject to a terminal disclaimer.

(21) Appl. No.: 10/344,274

(22) PCT Filed: Aug. 7, 2001

(86) PCT No.: PCT/EP01/09111

§ 371 (c)(1),
(2), (4) Date: Oct. 2, 2003

(87) PCT Pub. No.: WO02/12373

PCT Pub. Date: Feb. 14, 2002

(65) Prior Publication Data

US 2004/0054122 A1 Mar. 18, 2004

(30) Foreign Application Priority Data

Aug. 9, 2000 (FR) .......................................... 00 10483

(51) Int. Cl.[7] .................. C08G 69/08; C08G 73/10; B32B 27/00; C08L 77/00
(52) U.S. Cl. .................. 528/310; 528/170; 528/312; 528/322; 528/323; 528/328; 528/332; 528/335; 528/336; 528/339; 528/340; 528/347; 525/418; 525/419; 525/420; 525/422; 525/432; 524/600; 524/602; 524/606; 428/357; 428/364; 428/394; 428/395; 264/176.1
(58) Field of Search .................. 528/310, 170, 528/312, 322, 323, 332, 335–336, 339, 340, 328, 347; 525/418–420, 422, 432; 524/600, 602, 606; 428/357, 364, 394, 395, 396, 474.4; 264/176.1

(56) References Cited

U.S. PATENT DOCUMENTS

| 5,493,000 A | * | 2/1996 | Aharoni ...................... 528/350 |
| 5,576,387 A | * | 11/1996 | Chambers .................. 525/92 B |
| 5,696,202 A | * | 12/1997 | Torre .......................... 524/606 |
| 5,959,031 A | * | 9/1999 | Thurgood .................... 525/66 |
| 6,008,288 A | * | 12/1999 | Dalla Torre ................. 524/538 |
| 6,010,760 A | * | 1/2000 | Miyazaki et al. ......... 428/36.92 |
| 6,060,580 A | * | 5/2000 | Nijenhuis et al. ........... 528/332 |
| 6,160,080 A | * | 12/2000 | Cucinella et al. ........... 528/170 |
| 6,172,178 B1 | * | 1/2001 | Koning et al. .............. 528/310 |
| 6,277,911 B1 | * | 8/2001 | Torre .......................... 524/606 |
| 6,525,166 B1 | * | 2/2003 | Di Silvestro et al. ....... 528/310 |

FOREIGN PATENT DOCUMENTS

| WO | WO 95/06081 A | 3/1995 |
| WO | WO 99/03909 A | 1/1999 |

* cited by examiner

Primary Examiner—P. Hampton Hightower
(74) Attorney, Agent, or Firm—Burns, Doane, Swecker & Mathis, L.L.P.

(57) ABSTRACT

The invention concerns copolyamides obtained by using multifunctional monomers. It consists in using a multifunctional monomer comprising at least three reactive functions and at least another multifunctional monomer, in amounts such that the terminal group concentrations are balanced. The copolyamides are particularly high viscosity copolyamides. The invention also concerns compositions based on said copolyamides.

19 Claims, 2 Drawing Sheets

COPOLYAMIDES AND COMPOSITIONS BASED ON SAME

Figure 1:
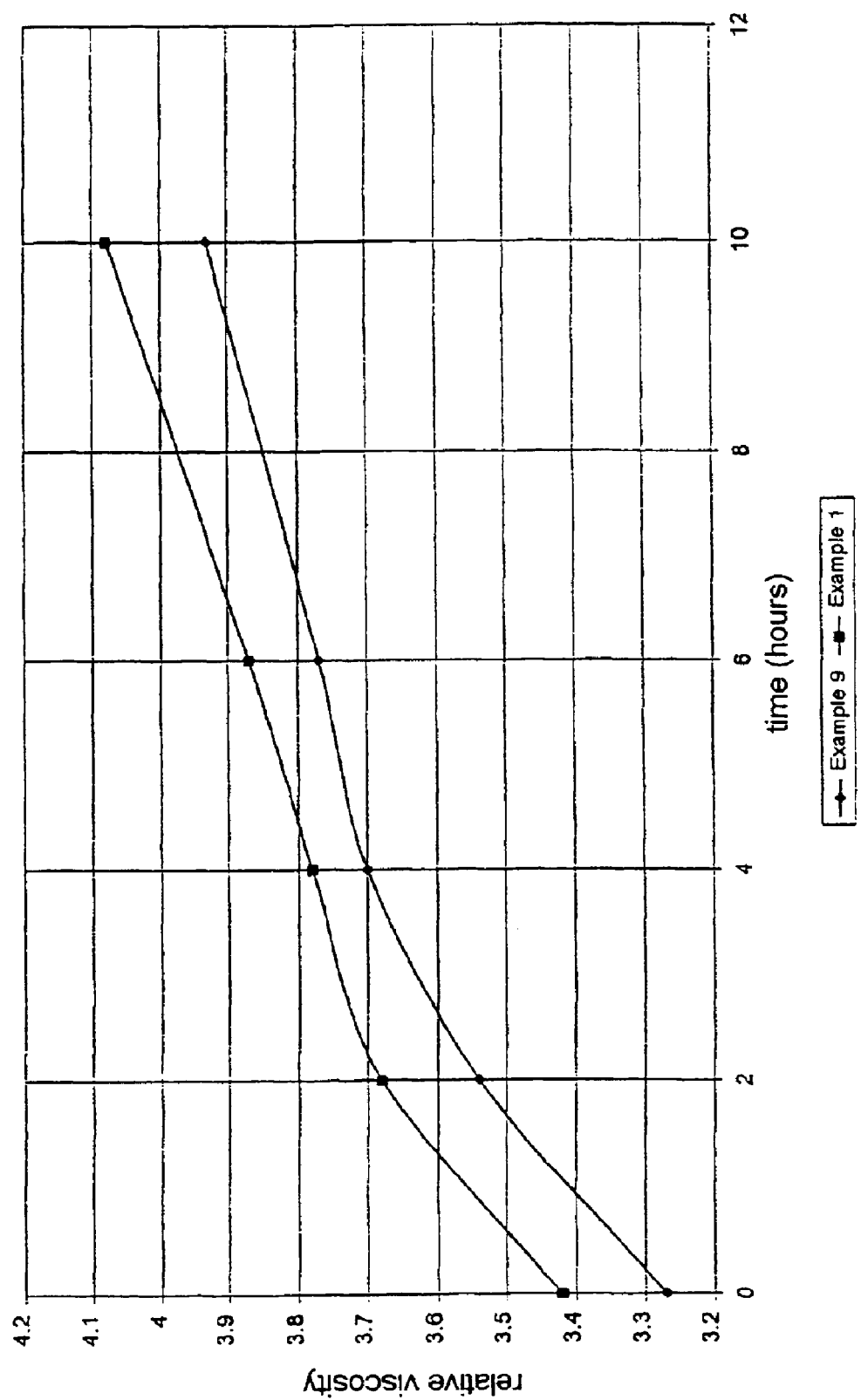

The present invention relates to copolyamides obtained using multifunctional monomers. The invention relates more particularly to high-viscosity polyamides. The invention also relates to compositions based on these copolyamides.

Formed thermoplastic polyamides are used for many applications. Examples that may be mentioned include yarns, fibers and filaments, films and articles obtained by molding, injection-molding or extrusion. For certain applications, or for certain forming processes, it is occasionally preferred to use polyamides with a high melt viscosity. This is the case, for example, for the polyamide fibers used for the manufacture of paper machine felts. This is also the case, for example, for processes for forming articles by extrusion blow-molding. During the implementation of the latter process, it is generally important for the extruded component not to deform, or to deform only very little under its own weight. The mechanical properties of the material, such as the elastic modulus and the impact strength, must moreover not be affected, or only very little affected.

Several solutions are known for obtaining high-viscosity polyamides. A first solution consists in performing a solid-phase postcondensation on linear polyamides. The postcondensation times are long, which gives rise to high production costs.

Another solution is described in patent application WO 99/03909. It describes copolyamides obtained using a multifunctional monomer comprising a reactive function that forms amide bonds, chosen from acids and amines, and at least two reactive functions that form amide bonds, which are of different nature and complementary to the previous function. These copolyamides have, for an identical melt-polycondensation time, a higher melt viscosity than that of linear polyamides.

However, the copolyamides described in the document have a viscosity that it is sought further to improve. Another object is to achieve equivalent viscosities with shorter and/or controlled polymerization cycle times.

The object of the invention is to propose novel copolyamides that especially have a higher melt viscosity or, for an equivalent viscosity, that may be obtained with shorter polymerization cycles.

To this end, the invention proposes a copolyamide, comprising macromolecular units derived from the following monomers:

(I) at least one difunctional monomer represented by the abbreviation AB (II) at least one multifunctional monomer represented by the abbreviation $A_aB_b$ in which A represents a carboxylic acid function and B represents an amine function, a and b being numbers that satisfy the following relationships:
  $a \geq 1$
  $b \geq 1$
  $a+b \geq 3$ (III) at least one multifunctional monomer represented by the abbreviation $A_cB_d$ in which A represents a carboxylic acid function and B represents an amine function, c and d being numbers that satisfy the following relationships:
  $c \geq 0$
  $d \geq 0$
  $c+d \geq 2$, the pair (c,d) being different than the pair (1,1)

the monomers (II) and (III) being chosen such that
  $d > c$ if $a > b$
  $d < c$ if $a < b$ the ratio $\alpha$, $$\alpha = \frac{ax + cy}{ax + cy + bx + dy},$$

being between 0.4 and 0.6,
in which x represents the number of moles of monomer (II) and y represents the number of moles of monomer (III).

The term "multifunctional monomer" means a monomer comprising at least two reactive functions.

In the present patent application, the abbreviations (AB, $A_aB_b$ and $A_cB_d$) are used to denote organic or organometallic molecules serving as monomers. The monomers are molecules with reactive functions of acid type A or of amine type B, capable together of forming amide bonds.

The acid-type functions are advantageously chosen from carboxylic acid, acid halide and ester functions. The amine-type functions are advantageously chosen from amines, preferably primary amines, and amine salts.

The number of functions of each type is represented for the various monomers by the letters a, b, c and d. The monomers (I) comprise a function of each type.

The monomers (II) and (III) comprise, respectively, at least 3 and 2 functions, and preferably not more than 10. The number of functions for each (a+b and c+d, respectively) is preferably chosen from 3, 4, 5 and 6.

The monomers (II) comprise at least three reactive functions, including at least one of each type. The monomers (III) comprise at least two reactive functions, which are either all of the same type, or of different types. The cases where all the functions are identical correspond to the case where c=0 (monomer comprising only amine-type reactive functions), or to the case where d=0 (monomer comprising only acid-type reactive functions). In the case where the monomers (III) comprise functions of different types, the number of functions is then strictly greater than two. These conditions are equivalent to those expressed by the equations and inequations presented above.

The number of moles of monomer (II) from which the copolyamide is obtained is denoted by the letter x. The number of moles of monomer (III) from which the copolyamide is obtained is denoted by the letter y. The number of moles of monomer (I) from which the copolyamide is obtained is denoted by the letter z.

The ratio $\alpha$, $$\alpha = \frac{ax + cy}{ax + cy + bx + dy}$$

is between 0.4 and 0.6 and preferably between 0.45 and 0.55. Even more preferably, it is substantially equal to 0.5. This condition is equivalent to writing that the number of amine-type functions and the number of acid-type functions in the monomers (II) and (III) used to obtain the polymer is relatively, or even substantially totally, equilibrated.

According to one characteristic of the invention, the ratio $\beta$, $$\beta = \frac{ax + cy + bx + dy}{(a + c + b + d) * (x + y + 0.9 * z)}$$

is less than 0.05 (5%). It is preferably less than 0.01 (1%) and, according to a very advantageous embodiment, less than 0.002 (0.2%). The use of monomers (II) and (III) in larger amounts may lead to copolymers with very high viscosities and as a result may oblige the use of special apparatus in order to be able to recover the polymer after it has been manufactured. As a guide, and with no limitation to the invention, the factor 0.9 applied to the number of moles z of the monomer of type AB takes into account that the monomers (I) generally do not react entirely. The above ratio is thus close to a ratio between the number of moles of monomers (II) and (III) and the number of moles of repeating units in the polyamide.

According to another characteristic of the invention, the ratio $\chi$, $$\chi = \frac{x+y}{x+y+0.9*z}$$

is preferably less than 0.25%.

The monomers (II) and the monomers (III) may consist, respectively, of a mixture of several monomers $A_{ai}B_{bi}$ and $A_{cj}B_{dj}$ in which $a_i$, $b_i$, $c_j$ and $d_j$ satisfy, for at least one of them, the conditions defined above for a, b, c and d with the possible exception of the calculation of the ratios $\alpha$, $\beta$ and $\chi$, for which the following apply:

$$ax = \sum_i a_i x_i \text{ for the calculation of } \alpha \text{ and } \beta$$

$$bx = \sum_i a_i x_i \text{ for the calculation of } \alpha \text{ and } \beta$$

$$cy = \sum_j c_j y_j \text{ for the calculation of } \alpha \text{ and } \beta$$

$$dy = \sum_j d_j y_j \text{ for the calculation of } \alpha \text{ and } \beta$$

$$x = \sum_i x_i \text{ for the calculation of } \beta \text{ and } \chi$$

$$y = \sum_j y_j \text{ for the calculation of } \beta \text{ and } \chi$$

in which
$a_i$ represents the number of acid-type functions in a monomer (II) referenced i
$b_i$ represents the number of amine-type functions in a monomer (II) referenced i
$c_j$ represents the number of acid-type functions in a monomer (III) referenced j
$d_j$ represents the number of amine-type functions in a monomer (III) referenced j
$x_i$ represents the number of moles of a monomer (II) referenced i
$y_j$ represents the number of moles of a monomer (III) referenced j.

By way of example of systems of monomers (I), (II) and (III) in which the monomer (III) is a monomer mixture, mention may be made of systems in which the monomers (II) and (III) are as follows:
monomer (II) $A_aB_b$ with a>b
monomers (III): monomer mixture $A_cB_0$ (multifunctional acid), and $A_0B_d$ (multifunctional amine), with c>0 and d>0, and in amounts such that the ratios $\alpha$ and $\beta$ are respected.

The monomers (I) are advantageously chosen from:
ε-caprolactam and/or the corresponding amino acid: aminocaproic acid, and/or
para- or meta-aminobenzoic acid, and/or
11-aminoundecanoic acid, and/or
lauryllactam and/or the corresponding amino acid: 12-aminododecanoic acid.

More generally, the monomers (I) may be the monomers used to manufacture linear thermoplastic polyamides. Thus, mention may be made of ω-amino-alkanoic compounds comprising a hydrocarbon-based chain containing from 4 to 12 carbon atoms, or the lactams derived from these amino acids, for instance ε-caprolactam. Mixtures of monomers corresponding to the abbreviation AB, preferably chosen from the monomers proposed above, may also be used.

The monomers (II) are denoted by the generic term "arborescent" monomers. They may be chosen for the implementation of the invention from the molecules represented by the following formula (b):

$$(XR_1)\text{—}R\text{—}(R_2Y)_n \qquad (b)$$

in which:
n is an integer greater than or equal to 2 and preferably between 2 and 10 (limits included) and preferably equal to 2,
$R_1$ and $R_2$ may be identical or different and represent a covalent bond or an aliphatic, arylaliphatic, aromatic or alkylaromatic hydrocarbon-based radical,
R is a linear or branched aliphatic radical, a substituted or unsubstituted cycloaliphatic radical, a substituted or unsubstituted aromatic radical possibly comprising several aromatic nuclei and/or hetero ketones
X represents an amine or amine salt function, or an acid, ester, acid halide or amide function
Y represents an amine or amine salt function when X represents an acid, ester, acid halide or amide function, and an acid, ester, acid halide or amide function when Y represents an amine or amine salt function.

The monomers (II) that are suitable and preferred according to the invention are especially the monomers that are heat-stable at a temperature above 150° C. Examples that may be mentioned include the monomers (II) in accordance with the formula presented above in which R represents an aromatic radical such as aminophthalic acid or a linear aliphatic radical such as 3-aminopimelic diacid or 6-aminoundecanedioic acid. Mention may also be made of α-amino acids such as aspartic acid and glutamic acid. Natural amino acids may also be used as monomer (II) if their heat-stability is sufficient. The conditions for synthesizing the copolyamide may also be adapted as a function of the heat-stability of the monomer (II).

Examples of monomers (II) that may be mentioned include:
5-aminoisophthalic acid,
6-aminoundecanedioic acid,
3-aminopimelic diacid,
aspartic acid,
3,5-diaminobenzoic acid,
3,4-diaminobenzoic acid,
lysine,
and mixtures thereof.

According to a first embodiment of the invention, the reactive functions of the monomer (III) are all identical, chosen from functions of acid or amine type. These monomers are denoted by the generic term "core monomers".

A first category of core monomers consists of molecules or macromolecules (used as monomers) with an arborescent or dendritic structure. Examples that may be mentioned include polyamines comprising a high number of amine units. Mention may also be made of the totally aromatic dendrimers described in patent application WO 95/06081.

A second category of core monomers consists of compounds that may be chosen from the compounds mentioned below.

Mention is made of multifunctional compounds chosen from the compounds of formula (a)

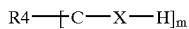

in which

C is a covalent bond or an aliphatic hydrocarbon-based radical that may comprise hetero atoms, and containing from 1 to 20 carbon atoms and preferably from 1 to 6 carbon atoms, X is a radical

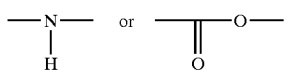

$R_4$ is a linear or cyclic, aromatic or aliphatic hydrocarbon-based radical containing at least two carbon atoms and possibly comprising hetero atoms, m is an integer between 3 and 8 (limits included).

According to yet another preferred characteristic, the radical $R_4$ is either a cycloaliphatic radical such as the tetravalent cyclohexanoyl radical, or a 1,1,1-triylpropane or 1,2,3-triylpropane radical.

Examples of other radicals $R_4$ suitable for the invention that may be mentioned include substituted or unsubstituted trivalent phenyl and cyclohexanyl radicals, tetravalent diaminopolymethylene radicals with a number of methylene groups advantageously between 2 and 12, such as the radical derived from EDTA (ethylenediaminotetraacetic acid), octavalent cyclohexanoyl or cyclohexadinonyl radicals, and radicals derived from compounds obtained from the reaction of polyols such as glycol, pentaerythritol, sorbitol or mannitol with acrylonitrile.

Radical A is preferably a methylene or polymethylene radical such as an ethyl, propyl or butyl radical, or a polyoxyalkylene radical such as a polyoxyethylene radical.

According to one preferred embodiment of the invention, the number m is greater than 3 and advantageously equal to 3 or 4.

The reactive function of the multifunctional compound represented by the symbol X—H is a function capable of forming an amide function.

Examples of multifunctional compounds of formula (a) that may be mentioned include 2,2,6,6-tetrakis(β-carboxyethyl)cyclohexanone, diaminopropane-N,N,N'N'-tetraacetic acid of the following formula:

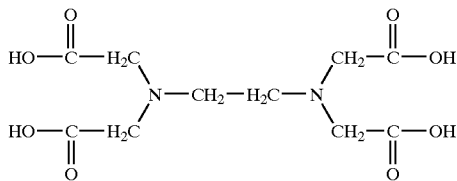

or compounds derived from the reaction of trimethylolpropane or glycerol with propylene oxide and amination of the hydroxide end groups; the latter compounds are sold under the trade name Jeffamines T® by the company Huntsman, and have the general formula:

in which:

$R_4$ represents a 1,1,1-triylpropane or 1,2,3-triylpropane radical,

A represents a polyoxyethylene radical.

Examples of multifunctional compounds that may be suitable are especially mentioned in document U.S. Pat. No. 5,346,984, in document U.S. Pat. No. 5,959,069, in document WO 96/35739 and in document EP 672 703.

The following may be mentioned more particularly: nitrilotrialkylamines, in particular nitrilotriethylamine, dialkylenetriamines, in particular diethylenetriamine, trialkylenetetramines and tetraalkylenepentamines, the alkylene preferably being ethylene, 4-aminoethyl-1,8-octanediamine.

Mention is also made of the dendrimers of formula (II)

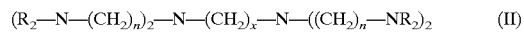

in which

R is a hydrogen atom or a group —$(CH_2)_n$—$NR^1_2$ in which
$R^1$ is a hydrogen atom or a group —$(CH_2)_n$—$NR^2_2$ in which
$R^2$ is a hydrogen atom or a group —$(CH_2)_n$—$NR^3_2$ in which
$R^3$ is a hydrogen atom or a group —$(CH_2)_n$—$NH_2$, n being an integer between 2 and 6, x being an integer between 2 and 14, N is preferably an integer between 3 and 4, in particular 3, and x is preferably an integer between 2 and 6, preferably between 2 and 4 (limits included), in particular 2. Each radical R may be chosen independently of the others. The radical R is preferably a hydrogen atom or a group —$(CH_2)_n$—NH2.

Mention is also made of multifunctional compounds containing 3 to 10 carboxylic acid groups, preferably 3 or 4. Among these, the ones that are preferred are the compounds containing an aromatic and/or heterocyclic ring, for example benzyl, naphthyl, anthracenyl, biphenyl and triphenyl radicals, or heterocycles, for instance pyridine, bipyridine, pyrrole, indole, furan, thiophene, purine, quinoline, phenanthrene, porphyrin, phthalocyanine and naphthalocyanine. 3,5,3',5'-Biphenyltetracarboxylic acid, acids derived from phthalocyanine and from naphthalocyanine, 3,5,3',5'-biphenyltetracarboxylic acid, 1,3,5,7-naphthalenetetracarboxylic acid, 2,4,6-pyridinetricarboxylic acid, 3,5,3',5'-bipyridyltetracarboxylic acid, 3,5,3',5'-benzophenonetetracarboxylic acid and 1,3,6,8-acridinetetracarboxylic acid are most particularly preferred, and even more particularly trimesic acid and 1,2,4,5-benzenetetracarboxylic acid.

Mention is also made of multifunctional compounds whose core is a heterocycle containing a point of symmetry, for instance 1,3,5-triazines, 1,4-diazines, melamine, compounds derived from 2,3,5,6-tetraethylpiperazine, 1,4-piperazines and tetrathiafulvalenes. Mention is made more particularly of 1,3,5-triazine-2,4,6-triaminocaproic acid (TTAC).

According to another embodiment, the monomers (III) are arborescent monomers that may be chosen from those mentioned as monomers (II), it being understood that:

they are of different nature the conditions regarding the number of functions are satisfied.

More generally, the choice of monomers (II) and (III) must firstly satisfy the conditions regarding the numbers of functions of each type (symbolized by the letters a, b, c and d). Certain combinations of the monomers (II) and (III) mentioned above are therefore not in accordance with the invention.

According to one particularly advantageous embodiment, the copolyamide is obtained from systems of monomers (I), (II) and (III), of which the monomers (II) and (III) are chosen from the following systems:

system 1: monomer (II) $AB_2$ and monomer (III) $A_3$ or $A_4$
system 2: monomer (II) $A_2B$ and monomer (III) $B_3$ or $B_4$.

According to one preferred embodiment, no monofunctional monomer is used in addition to the monomers (I), (II) or (III).

In order to be able to perform the polymerization under the best possible conditions, monomers with a sufficient heat stability are most particularly preferred for the monomers (I), (II) and (III).

According to one advantageous characteristic, the melt flow index of the copolyamides, measured at 275° C. under 5 kg of pressure, is less than 10 g/10 minutes.

The invention also relates to compositions comprising the copolyamide described above. The compositions may comprise at least one polyamide in accordance with the invention and optionally other additives such as molding or mold-stripping agents, heat-stabilizers, light-stabilizers, antioxidants, flame retardants, pigments, colorants and lubricants. The composition may also comprise agents for improving the impact strength and/or bulking or reinforcing fillers. Mention is made in particular of glass fibers.

The compositions of the invention may also comprise as polymer matrix, in addition to the polyamide as described above, other thermoplastic materials such as linear aliphatic polyamides, optionally compatibilized, or aromatic or semi-aromatic polyamides, for example.

According to one characteristic of the invention, the compositions of the invention are obtained by blending, generally in a single-screw or twin-screw extruder, a polyamide in accordance with the invention with the various additives, this blending generally being performed with the polyamide melt, followed by extrusion of the blend in the form of rods that are then chopped into granules. Molded parts may then be made by melting the granules produced above and feeding the composition melt into suitable molding, injection-molding or extrusion devices.

A subject of the invention is also a process for manufacturing a copolyamide in accordance with the invention.

In a first embodiment of this manufacturing process, a mixture of monomers is prepared with determined proportions of each component. Said mixture is polymerized under conditions and according to a procedure equivalent to those used for the manufacture of the linear polyamide corresponding to the difunctional monomers used. Thus, when ε-caprolactam is used, water is added to the mixture of monomers to initiate the hydrolytic opening of the caprolactam.

According to a second embodiment of the invention, a linear polyamide prepolymer is manufactured by polycondensation of the monomers (I) to obtain a prepolymer with a number-average molecular weight $\overline{Mn}$ of the order of 2 000 to 3 000 approximately.

The monomers (II) and (III) are added to the linear prepolymer and the polymerization is continued either in molten medium or in solid phase. The solid-phase production method makes it possible especially to obtain copolyamides using multifunctional monomers that show heat stability at relatively low temperatures, for example below 200° C., since the solid-phase postcondensation temperature is reached at lower temperatures than those for polymerization in molten medium.

The addition of the monomers (II) and (III) may be performed in the extruder or in a reactor, the solid-phase postcondensation being carried out according to the standard conditions usually used for that of linear polyamides.

According to another variant of this embodiment of the process for manufacturing a copolyamide in accordance with the invention, the monomers (II) and (III) are added with a catalyst, thus making it possible to perform the reaction directly in the extruder. The catalysts that are suitable are the catalysts conventionally used for amidation or polycondensation reactions of amide functions, for example such as phosphorus-based compounds.

The invention also relates to a process for manufacturing novel copolyamides or novel compositions by extrusion, and to the copolyamides or compositions obtained by the process. This process uses multifunctional compounds, under conditions similar to those described above, and lead to macromolecular compounds or compositions whose characteristics are similar if not identical to those of the copolyamides and compositions described above.

A process is thus proposed for the manufacture of a copolyamide or a composition comprising a copolyamide, which consists in mixing in an extrusion device at least the following three compounds:

compound (I): a polyamide containing repeating units of formula (c) below:

$$-[NH-R_3-CO]- \qquad (c)$$

compound (II): monomer (II) as defined above
compound (III): monomer (III) as defined above
the ratio α, $$\alpha = \frac{ax+cy}{ax+cy+bx+dy},$$

being between 0.4 and 0.6,
in which x represents the number of moles of compound (II) and y represents the number of moles of compound (III)
the ratio β, $$\beta = \frac{ax+cy+bx+dy}{(a+c+b+d)*(x+y+z)}$$

being less than 1% and preferably 0.5%,
in which z represents the number of moles of repeating units in compound (I)
the radical $R_1$ being a hydrocarbon-based radical optionally comprising hetero atoms.
z is defined in the following manner:
z=$m_D/M_D$ in which $m_D$ is the mass of compound (I) used and $M_D$ is the molar mass of a repeating unit.
The ratio

$$\alpha = \frac{ax+cy}{ax+cy+bx+dy}$$

is preferably between 0.45 and 0.55. Even more preferably, it is substantially equal to 0.5.

The ratio $$\chi = \frac{x+y}{x+y+z}$$

is preferably less than 0.5%.

Compound (I) is preferably chosen from polyamide 6, polyamide 11, polyamide 12 and blends and copolymers based on these polyamides.

The process may comprise the introduction of fillers or additives as mentioned above. Glass fiber is most particularly mentioned.

The copolyamides or compositions according to the invention may be used in many applications, such as the manufacture of molded or injection-molded parts.

They are especially suitable for manufacturing parts by extrusion blow-molding techniques. Specifically, the low melt flow index of the copolyamide makes it possible to limit the deformations of the parisons during their extrusion, before the blow-molding step.

It is also possible to manufacture articles by injection-molding processes using the copolyamides of the invention. These articles have mechanical properties that are markedly higher than those of the articles obtained by injection-molding of a linear polyamide-based composition of the same melt flow index.

Other details or advantages of the invention will emerge more clearly in the light of the examples given below, purely for indicative purposes.

The following monomers are used:
CL: caprolactam
AIA: 5-aminoisophthalic acid
DAB: 2,5-diaminobenzoic acid
J3: Jeffamine T 403, sold by the company Huntsman (triamine core monomer)
T4: 2,2,6,6-tetrakis(β-carboxyethyl)cyclohexanone (tetraacid core monomer).

The copolyamides are synthesized according to one of the two cycles below:

Cycle 1:
11.3 kg of caprolactam, 300 g of water and various amounts of the monomers mentioned above are mixed together in an autoclave equipped with heating and stirring means. The mixture is heated for 4 hours until a pressure of 3–6 bar is reached, the pressure is reduced over two hours down to a pressure of 0.2 bar, with an internal vacuum the pressure is reduced to 400 mm/Hg over two hours, and this pressure is maintained for 30–60 minutes. The polymer obtained is extruded under nitrogen pressure (4 to 6 bar).

Cycle 2:
Polymerization in an autoclave for 10 hours at atmospheric pressure, at 275° C., with circulation of nitrogen.

The characteristics and properties of the copolyamides evaluated are as follows:
melt flow index (MFI): evaluated according to standard ISO 1133 at 275° C. under 5 kg of pressure.
relative viscosity (RV): evaluated in 96% sulfuric acid solution, according to standard ISO 307,
$NH_2$ and COOH end groups: evaluated by potentiometric analysis. Expressed as meq/kg of polymer,
mechanical properties:
    impact: notched IZOD impact strength, measured at 23° C. under 50% relative humidity, on dry material, according to standard ISO 180/1A.
    modulus, elongation, yield stress: measured at 23° C. under 50% relative humidity, on dry material, according to standard ISO 527.

EXAMPLES 1 TO 16

Various copolyamides are synthesized, the characteristics of which are given in table I. The nature of the monomers (II) and (III) used, and the amount in molar percentage (respective ratios $$\frac{x}{x+y+0.9*z} \text{ and } \frac{y}{x+y+0.9*z}$$

are specified for each copolyamide. Monomer (I) is caprolactam.

TABLE I

| Example | Monomer (II) (nature, mol %) | Monomer (III) (nature, mol %) | Cycle |
|---|---|---|---|
| 1 | DAB; 0.004 | T4; 0.001 | 1 |
| 2 | DAB; 0.008 | T4; 0.002 | 1 |
| 3 | DAB; 0.024 | T4; 0.006 | 1 |
| 4 | DAB; 0.04 | T4; 0.01 | 1 |
| 5 | DAB; 0.12 | T4; 0.03 | 1 |
| 6 | DAB; 0.16 | T4; 0.04 | 1 |
| 7 | AIA; 0.1125 | J3; 0.0375 | 1 |
| 8 | DAB; 0.075 | AIA; 0.075 | 1 |
| 9 (comparative) | / | / | 1 |
| 10 (comparative) | AIA; 0.15 | / | 1 |
| 11 (comparative) | DAB; 0.15 | / | 1 |
| 12 (comparative) | / | / | 2 |
| 13 | AIA; 0.15 | / | 2 |
| 14 | AIA; 0.1125 | J3; 0.0375 | 2 |
| 15 (comparative) | DAB; 0.15 | / | 2 |
| 16 | DAB; 0.12 | T4; 0.03 | 2 |

The characteristics and properties are given in table II.

TABLE II

| Example | MFI (g/10 min) | VR | $NH_2$ (meq/kg) | COOH (meq/kg) |
|---|---|---|---|---|
| 1 | 30 | 3.45 | 37.1 | 37.9 |
| 2 | 27 | 3.49 | 36.8 | 37.3 |
| 3 | 19 | 3.58 | 34.4 | 35.5 |
| 4 | 12 | 3.78 | 32.7 | 34.6 |
| 5 | 6 | 4.22 | 29.3 | 31.7 |
| 6 | <3.5 | >4.3* | 27.2 | 29.9 |
| 7 | 8.5 | 3.87 | 33.1 | 29.5 |
| 8 | 10.5 | 3.97 | 30.8 | 32.4 |
| 9 | 34 | 3.21 | 42.4 | 41.4 |
| 10 | 22 | 3.41 | 22.7 | 45.5 |
| 11 | 18 | 3.5 | 51.3 | 24.2 |
| 12 | 15 | 3.89 | 30.9 | 31.9 |
| 13 | 4.5 | 4.55 | 27 | 54 |
| 14 | 2.1 | 5.46 | 25.5 | 21 |
| 15 | 5.2 | 4.72 | 34.8 | 19.7 |
| 16 | 1.7 | 5.73 | 22.5 | 20.6 |

The mechanical properties of certain polymers are given in table III.

TABLE III

| Polymer | Impact (kJ/m²) | Modulus (N/mm²) | Elongation (%) | Yield stress (N/mm²) |
|---|---|---|---|---|
| Example 9 | 5.2 | 2610 | 70 | 46.2 |
| PA 6 VR 4 | 5.7 | 2780 | 90 | 46.7 |
| Example 10 | 4.9 | 2638 | 85 | 49.1 |
| Example 1 | 5.5 | 2990 | 71 | 47 |
| Example 5 | 5.7 | 2990 | 90 | 48 |

EXAMPLE 17

A solid-phase postcondensation is carried out, at 175° C., under nitrogen, on a copolyamide according to example 1 and a linear polyamide 6 according to example 9, respectively. The relative viscosity of the polymers is measured every two hours.

A BRIEF DESCRIPTION OF THE DRAWINGS

The curves representing the change are given in FIG. 1, with the time in hours on the y-axis and the relative viscosity on the x-axis.

It is observed that the relative viscosity does not vary for the copolyamides according to the invention. The molecular mass of the copolyamides according to the invention is thus easy to control.

EXAMPLE 18

The rheological properties of various polyamides and copolyamides are evaluated, at different shears. A GOETTFRERT WinRHEO V 3.22 capillary rheometer is used to do this; at a temperature of 250° C., and pressures of 65 to 1 200 bar. These measurements are performed on the following polymers, respectively:

copolyamide according to example 5 polyamide 6 of relative viscosity 4 (PA 6 RV 4)

polyamide 6 of relative viscosity 5 (PA 6 RV 5).

Figure 2:
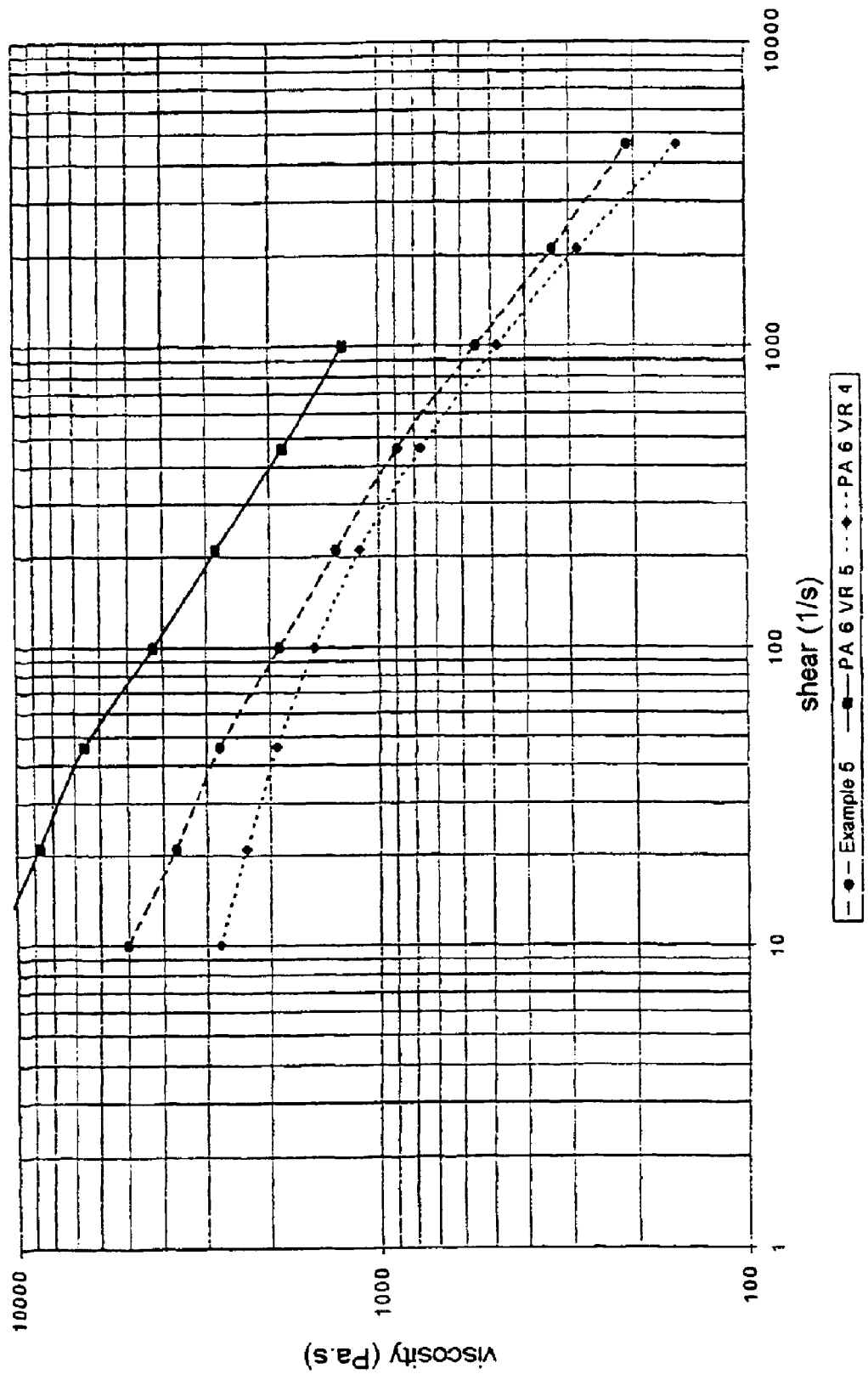

The curves representing the melt viscosity (Pa.s) as a function of the shear ($s^{-1}$) are given in FIG. 2.

It is observed that the difference in rheological behavior between a copolyamide according to the invention and a linear polyamide is more pronounced at low shear than at high shear. This makes the copolyamides according to the invention particularly advantageous, especially for extrusion processes. They show good processability in an extruder (high shear) and also a high viscosity at low shear, after extrusion, for a blow-molding operation.

EXAMPLE 20

Bottles are manufactured by extrusion blow-molding using a Comec MS 1000 machine, under the following conditions:

temperature profile in the extruder (° C.): 220, 230, 235, 235, 240, 240, 240, 235 pressure: 200 bar screw: 40 rpm blow-molding pressure: 4 bar blow-molding time: 8 seconds cycle time: 16 seconds polymer used: example 5.

The weight of the bottles obtained is 115±10 g. The walls have a constant and uniform thickness, with excellent surface aspect.

What is claimed is:

1. A copolyamide, comprising macromolecular units derived from the following monomers:
   (I) at least one difunctional monomer represented by the abbreviation AB
   (II) at least one multifunctional monomer represented by the abbreviation AaBb in which A represents a carboxylic acid function and B represents an amine function, a and b being numbers that satisfy the following relationships:
   $a \geq 1$
   $b \geq 1$
   $a+b \geq 3$
   (III) at least one multifunctional monomer represented by the abbreviation AcBd in which A represents a carboxylic acid function and B represents an amine function, c and d being numbers that satisfy the following relationships:
   $c \geq 0$
   $d \geq 0$
   $c+d \geq 2$, the pair (c,d) being different than the pair (1,1)
   the monomers (II) and (III) being chosen such that
   $d > c$ if $a > b$
   $d < c$ if $a < b$
   the ratio $$\frac{ax + cy}{ax + cy + bx + dy}$$

being between 0.4 and 0.6,
   in which x represents the number of moles of monomer (II) and y represents the number of moles of monomer (III)
   the ratio $$\frac{ax + cy + bx + dy}{(a + c + b + d) * (x + y + 0.9 * z)}$$

is less than 0.05,
   in which z represents the number of moles of monomer (I).
2. The copolyamide as claimed in claim 1, wherein the ratio $$\frac{ax + cy + bx + dy}{(a + c + b + d) * (x + y + 0.9 * z)}$$

is less than 0.01,
   in which z represents the number of moles of monomer (I).
3. The copolyamide as claimed in claim 2, wherein the ratio $$\frac{ax + cy + bx + dy}{(a + c + b + d) * (x + y + 0.9 * z)}$$

is less than 0.002.
4. The copolyamide as claimed in claim 1, wherein the ratio $$\chi = \frac{x + y}{x + y + 0.9 * z}$$

is less than 0.25%.
5. The copolyamide as claimed in claim 1, wherein integers a, b, c and d are chosen so as to satisfy one of the following series of relationships:
   $a > b$, $c = 0$, $d \geq 3$
   $a > b$, $d = 0$, $c \geq 3$.
6. The copolyamide as claimed in claim 1, wherein $a = 1$, $b = 2$, $c = 4$ and $d = 0$.
7. The copolyamide as claimed in claim 1, wherein the melt flow index, measured at 275° C. under a 5 kg load, is less than 10 g/10 minutes.
8. The copolyamide as claimed in claim 1, wherein the monomer (I) is a lactam, an amino acid or a mixture of these compounds.
9. The copolyamide as claimed in claim 1, wherein the monomer (I) is elected from the group consisting of caprolactam and aminocaproic acid, and mixtures thereof.
10. The copolyamide as claimed in claim 1, wherein monomer (II) is represented by formula (b): $(XR_1)$—R—$(R_2Y)_n$ (b)

in which:
- n is an integer greater than or equal to 2, limits included,
- $R_1$ and $R_2$ may be identical or different and represent a covalent bond or an aliphatic, arylaliphatic, aromatic or alkylaromatic hydrocarbon radical,
- R is a linear or branched aliphatic radical, a substituted or unsubstituted cycloaliphatic radical, a substituted or unsubstituted aromatic radical optionally comprising several aromatic nuclei and/or hetero ketones
- X represents an amine or amine salt function, or an acid, ester, acid halide or amide function
- Y represents an amine or amine salt function when X represents an acid, ester, acid halide or amide function, and an acid, ester, acid halide or amide function when Y represents an amine or amine salt function.

11. The copolyamide as claimed in claim 1, wherein the monomer (III) is represented by formula (a)

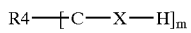  (a)

in which
- C is a covalent bond or an aliphatic hydrocarbon radical optionally comprising hetero atoms, and containing from 1 to 20 carbon atoms,
- X is a radical

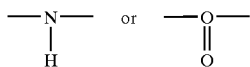

- $R_4$ is a linear or cyclic, aromatic or aliphatic hydrocarbon radical containing at least two carbon atoms and optionally comprising hetero atoms,
- m is an integer between 3 and 8, limits included.

12. The copolyamide as claimed in claim 11, wherein the multifunctional compound is selected from the group consisting of 2,2,6,6-tetrakis(β-carboxyethyl)cyclo-hexanone, trimesic acid, 2,4,6-tris(aminocaproic acid)-1,3,5-triazine and 4-aminoethyl-1,8-octanediamine.

13. The copolyamide as claimed in claim 1, which is obtained by mixing, in an extrusion device, at least the following three compounds:

compound (I): a polyamide containing repeating units of formula (c) below: —(NH—$R_3$—CO]— (c)

compound (II): monomer (II) as defined above compound (III): monomer (III) as defined above the ratio α, $$\alpha = \frac{ax + cy}{ax + cy + bx + dy},$$

being between 0.4 and 0.6, in which x represents the number of moles of compound (II) and y represents the number of moles of compound (III)

the ratio β, $$\beta = \frac{ax + cy + bx + dy}{(a + c + b + d) * (x + y + z)}$$

being less than 1%, in which z represents the number of moles of repeating units in compound (I)

the radical $R_1$ being a hydrocarbon radical optionally comprising hetero atoms.

14. A composition comprising a copolyamide matrix and a reinforcing filler, wherein the matrix comprises a copolyamide as claimed in claim 1.

15. A yarn, fiber, filament, molded or injection-molded article, or film comprising a copolyamide or a composition as claimed in claim 1.

16. An article obtained by extrusion blowmolding of a polyamide or a composition as claimed in claim 1.

17. The copolyamide as claimed in claim 10, wherein n is an integer between 2 and 10 (limits included).

18. The copolyamide as claimed in claim 10, wherein n is equal to 2.

19. The copolyamide as claimed in claim 11, wherein C is an aliphatic hydrocarbon radical optionally comprising heteroatoms and containing 1–6 carbon atoms.

* * * * *